Figure 1:
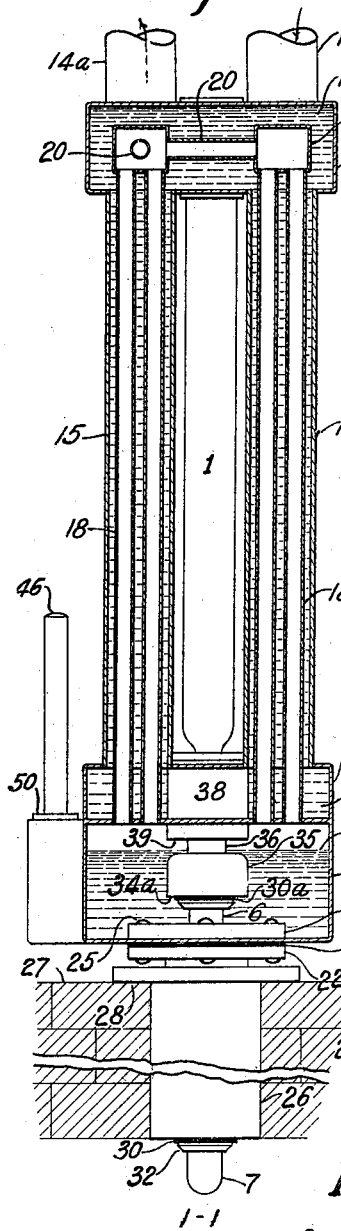

G. F. MACHLET.
PYROMETER.
APPLICATION FILED AUG. 26, 1910. RENEWED FEB. 17, 1916.

1,193,911.

Patented Aug. 8, 1916.
2 SHEETS—SHEET 1.

WITNESSES:
K. Frankfort
B. Goldberg

INVENTOR
George F. Machlet
BY
Stickney
ATTORNEY

G. F. MACHLET.
PYROMETER.
APPLICATION FILED AUG. 26, 1910. RENEWED FEB. 17, 1916.
1,193,911.
Patented Aug. 8, 1916.
2 SHEETS—SHEET 2.
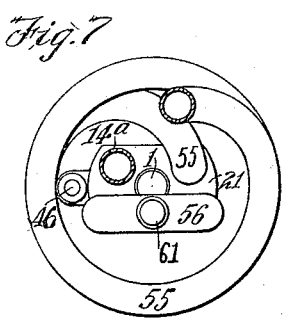
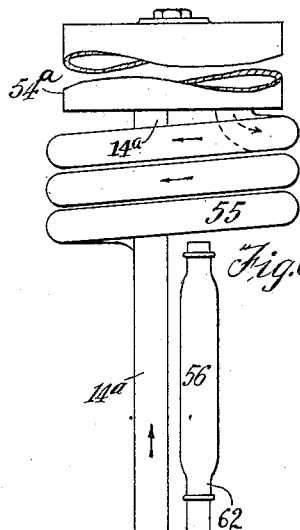
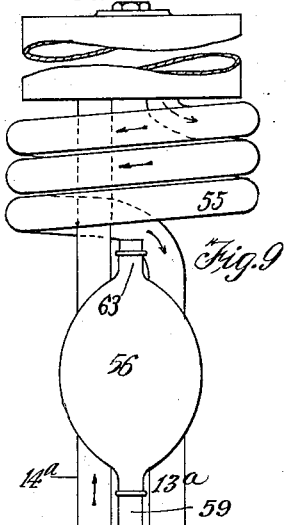
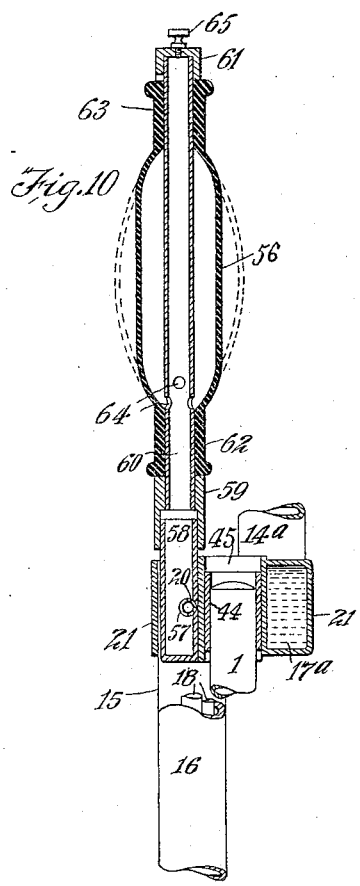
WITNESSES:
K. Frankfort.
F. E. Alexander
INVENTOR
George F. Machlet
BY
B. C. Stickney
ATTORNEY

UNITED STATES PATENT OFFICE.

GEORGE F. MACHLET, OF ELIZABETH, NEW JERSEY.

PYROMETER.

1,193,911.  Specification of Letters Patent.  Patented Aug. 8, 1916.

Application filed August 26, 1910, Serial No. 579,056. Renewed February 17, 1916. Serial No. 78,979.

*To all whom it may concern:*

Be it known that I, GEORGE F. MACHLET, a citizen of the United States, residing in Elizabeth, in the county of Union and State of New Jersey, have invented certain new and useful Improvements in Pyrometers, &c., of which the following is a specification.

This invention relates generally to devices intended to be operated or otherwise affected by high heat, such as the heat of a furnace, and it relates more particularly to pyrometers.

According to this invention the heat of a member which is exposed to the flames or gases of a furnace is substantially reduced, preferably by means of a suitable liquid, such as water, and the heat of this member, which is neither so hot as the furnace nor so cool as the liquid, forms the basis for the use of any desired thermotic device, as for instance, a device for indicating the heat of the furnace.

In the preferred form of the invention, a copper tube is inserted in a flask containing a stable body of water, that is to say, a relatively stationary or motionless body of water of approximately constant depth and volume, as opposed to a constantly flowing stream or current of water, the lower end of the tube projecting below the flask in the form of a nipple to be exposed to high heat. The water in the flask surrounds the tube and absorbs a large portion of the heat of the tube; a condenser or any suitable means being provided for dissipating the heat which is absorbed by the water. The water remains always at the boiling point, that is, at a fixed temperature, during the fluctuations in the heat of said tube, due to the provision of the condenser or analogous device or means, and therefore by ascertaining or indicating the heat of the tube, it becomes a simple matter to ascertain or indicate the degree of heat to which the nipple is exposed. In constructing a pyrometer the bulb or lower portion of a glass thermometer tube is inserted in said copper tube, and the scale on the thermometer tube is exaggerated, so that for instance an elevation of one degree in the actual heat of the mercury in the thermometer tube will read as four degrees on said scale; the heat of said copper tube being preferably only about one-fourth the heat of the flames or gases to which the nipple is exposed. Thus by the use of mercury, temperatures much higher than the boiling point of mercury can be readily ascertained. The invention, however, as to certain of its features, is not limited to use in pyrometers, as the feature of providing a cooling bath for a metal part that is exposed to the flame may be used in a variety of ways in connection with other thermotic devices and for a variety of purposes, particularly when the flame-heated and liquid-cooled member is in the form of a tube in which a portion of the thermotic device can be inserted.

Other features and advantages will hereinafter appear.

Figure 2:
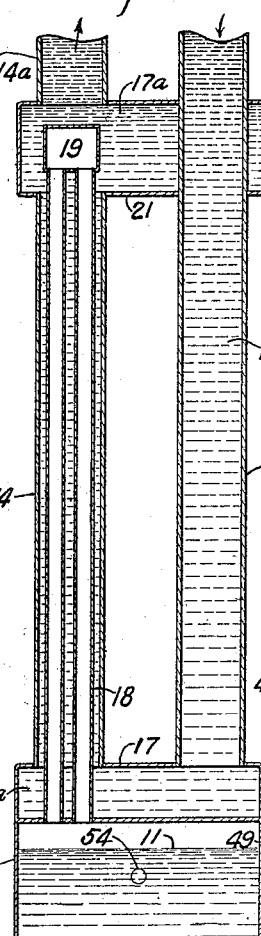
Figure 3:
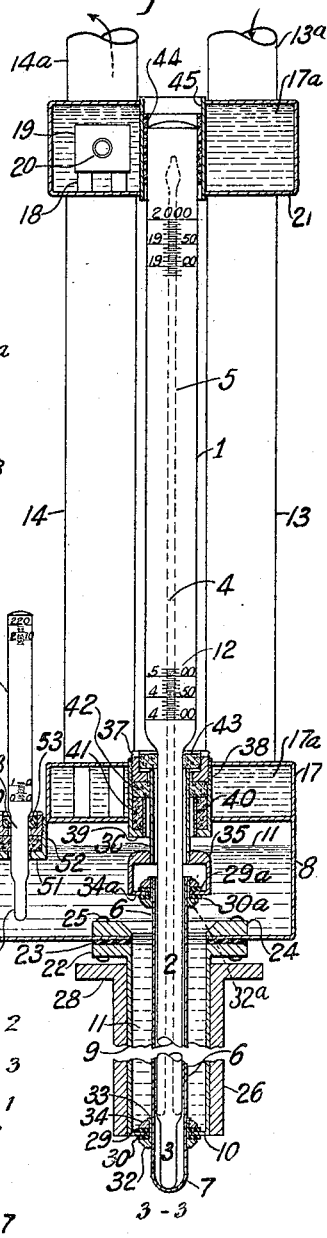
Figures 4, 5, 6:
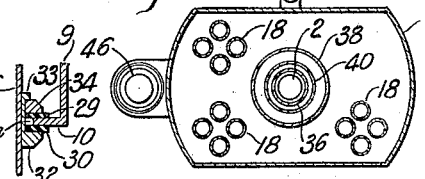

In the accompanying drawings, Figure 1 is a sectional elevation of the apparatus as applied to a furnace, taken about on the line 1—1 of Fig. 4, showing a nipple projected within the flame chamber of the furnace. Fig. 2 is a sectional elevation taken at about the line 2—2 of Fig. 4. Fig. 3 is a sectional central elevation taken at about the line 3—3 of Fig. 4. Fig. 4 is a horizontal section taken through the upper portion of the apparatus. Fig. 5 is a horizontal section taken through the large chamber of the flask which forms the lower portion of the apparatus. Fig. 6 is a sectional detail showing a part of the lower portion of Fig. 3, but on a larger scale. Fig. 7 is a sectional plan of the upper part of the apparatus in its preferred form. Fig. 8 is a side elevation, and Fig. 9 is a front elevation of the preferred form of the apparatus. Fig. 10 is a sectional elevation taken about centrally of Fig. 9, to show one means for preserving substantial uniformity of pressure within the flask and condensing coil, so that the boiling point of the water may not vary unduly.

A vertical glass thermometer-tube containing mercury is employed, comprising a body portion 1, bearing graduations 2 from 400 to 2000 or more degrees (it not being deemed important to measure heat below 400 degrees) this body portion surmounting an elongated stem portion 2, which, at its bottom, terminates in a mercury bulb 3, of reduced diameter, the mercury being seen at 4. From the bulb the mercury rises in a fine central tube 5 within the members 2 and 1, which are hollow.

The stem portion 2 of the glass thermometer, for a substantial portion or nearly all of its length, is inserted in a tubular thermal sheath 6, Fig. 3, which may be in the form of a scabbard or ferrule, terminating at its lower end in a nipple portion 7, and formed of a metal which is an excellent conductor of heat, such as copper. This thermal sheath is suitably supported, and serves to sustain or help sustain the glass thermometer tube (which is intended to be removable from the instrument), the lower end of the bulb 3 preferably resting directly upon the floor of the member 7.

The body 1 of the thermometer tube rises from a liquid receptacle or flask 8; and it will be seen that the glass stem 2 and the thermal sheath 6 both extend down through the bottom of said receptacle, and down through a well 9 provided in the bottom of said receptacle and forming part of the flask, and also down through the bottom 10 of said well; the nipple portion 7 of the thermal sheath projecting below the remainder of the instrument, and being intended for direct contact with the flames or gases of the furnace whose heat is to be measured; the mercury bulb 3 of the thermometer being within the nipple 7 and preferably in direct contact therewith.

The well 9 is filled with distilled water 11, which rises preferably above the thermal sheath 6 and nearly to the top of the receptacle 8. In place of water, any other liquid having a suitable fixed boiling point may be employed. The water is in the form of a stable, or constantly stationary or motionless body, which is maintained at a substantially constant depth and at substantially its boiling point in the manner hereinafter explained.

When the instrument is in use, the heat which is received by the small projecting portion or nipple 7 of the thermal sheath is quickly conducted up through the walls of said thermal sheath 6, and since said walls are immersed in the water 11, the water takes up the heat, and in consequence the nipple 7 cannot melt, nor in fact does it become so hot as the flames or gases to which it is exposed. This is due to the fact that the water 11 cannot become hotter than 212 degrees Fahrenheit. As is well known, the copper bottom of an ordinary tea-kettle does not become substantially hotter than the water with which it is in contact, even though flames play on the under side of the kettle; and for a similar reason the nipple 7, although it does become hotter than the water 11, still, owing to the rapid convection of heat along its walls, and the rapid absorption of such heat by the water, does not become so hot as the flames which surround it. The height of the temperature to which the nipple and the thermal sheath may rise, depends to a great extent (other things being equal) upon what length of nipple is projected into the flames. If the nipple projects more, the heat of the body of the thermal sheath will become greater; whereas if the nipple is constructed to project less, the heat of the body would never rise so high. It depends largely upon the ratio of heat absorption between the furnace-heated nipple 7 and the boiling water or other liquid surrounding the upper part 6 of the thermal sheath. In other words, it depends partly upon the capacity of the nipple 7 to absorb and transmit heat from the furnace, and partly upon the capacity of boiling water (or other liquid) to absorb heat from the upper portion 6 of the thermal sheath. In practice the projection of the nipple is preferably such that it will become heated to about 500 degrees Fahrenheit when the heat of the furnace has reached its maximum, for instance about 2000 or more degrees Fahrenheit. In other words, the maximum heat to which the mercury in the thermometer is subjected is 500 degrees, which is safely below the boiling point of the mercury.

The scale or graduations 12 on the pyrometer preferably read from 400 to 2000 or more degrees, as previously stated, while the heat of the mercury rises to about 500 degrees. It will be understood that, although largely immersed in water which cannot rise above 212 degrees, (or in some other suitable liquid with a fixed boiling point,) still the thermal sheath 6 can rise in temperature to 500 degrees, because of the projection of the nipple portion 7 below the water and in contact with the flames or gases; the water being unable to absorb heat rapidly enough from the thermal jacket to maintain it at 212 degrees under these circumstances. Therefore when the heat of the furnace is about 2000 or more degrees, the heat of the thermal jacket (and hence of the thermometer) will be about 500 degrees, and that of the water 11 will of course be 212 degrees, while the reading on the scale 12 will be about 2000 or more degrees; each rise of a degree in the actual heat of the mercury being read or indicated as 4 degrees by said scale. If a shorter nipple 7 is used, each rise of a degree in the actual heat of the mercury will be read or indicated as more than 4 degrees on the scale, the latter being correspondingly shortened; whereas if a longer nipple is employed, each rise of a degree in the actual heat of the mercury will read or indicate less than 4 degrees upon the scale, the divisions upon which should be lengthened to correspond; although care should be taken that the mercury is not caused to rise to its boiling point.

The steam or vapor which rises from the boiling water 11 in the receptacle or flask 8 may be condensed in any suitable way, and returned to the boiler. The form of condenser which is illustrated comprises four stand-pipes 13, 14, 15, 16, rising from a box or vessel 17, into which they open; said pipes and vessel containing water 17ª for condensing the steam, which rises in small tubes 18, opening into the flask and arranged in three clusters, one cluster in each pipe 14, 15 and 16, and each cluster comprising four of the tubes 18; all of which extend through the bottom of the receptacle 17 and open into the flask 8. The cold water is supplied through the vertical pipe 13, which may be connected to a tank or other source of supply; and the heated water rises in the pipes 14, 15, 16, and returns to the tank, or otherwise escapes, through pipe 14ª, whereby much of the heat applied to the nipple 7 is finally dissipated.

At their upper ends the clusters of condensing tubes 18 are connected, thus constituting in effect a coil, the tubes of each cluster opening into a drum 19, the drums being connected by pipes 20. Said drums are contained in a box or chamber 21, into which the vertical pipes 14, 15 and 16 (but not 13) open at their upper ends.

It will be seen that the steam will rise from the boiling water 11 up through the clusters of tubes 18, each of which is in free communication at top and bottom with all the rest, so that the water in the pipes 14, 15 and 16 and in the box 21 will condense the steam; the water of condensation dropping back into the flask 8, so that the thermal sheath 6 is kept constantly immersed throughout its length in water of the uniform constant temperature of about 212 degrees Fahrenheit, and the body of water itself is constantly maintained at substantially the same depth.

The well 9 is in the form of a shell, having a top flange 22 whereby it is secured to the under surface of the bottom of the flask 8; a heat-insulating washer 23 being placed between said flange and said bottom. Within the flask is a ring 24, to hold fastenings 25 which extend down into the flange 22 and make a water-tight joint.

The well is incased in a protecting casing sleeve or tube 26, which may be made either of magnesia or some other refractory material which will not only protect the parts from burning or scaling and other injury, but also tend to minimize the heating of the well from the wall of the furnace (which is indicated diagrammatically in cross section at 27, Fig. 1). The casing 26 has a top flange 28, which rests upon the top of the furnace wall 27. The length of the sleeve 26, well 9, thermal sheath 6 and stem 2 of the thermometer may be varied as required by circumstances, dependent upon the thickness of the wall 27 of the furnace and other conditions. In practice the depth of the well 9 may be about twelve inches and the thermal sheath 6 may be about ⅝ of an inch in diameter.

It is found in practice to be important, in order to secure accurate and positive results, to insulate the thermal sheath 6 from the other metal parts of the instrument as far as possible, principally so that heat will not be disseminated from said thermal sheath through the other metal portions of the device, which would tend to render the instrument uncertain. This insulation may comprise washers 29, 30 of mica or other suitable non-conducting material, Figs. 3 and 6, surrounding the lower portion of the thermal sheath 6, and placed one inside and one outside of the floor 10 of the well 9. The sheath 6 fits within a hollow rivet 32, the stem of which extends up through said washers and through the floor 10, and at its upper end is turned over at 33 upon a metal washer 34, to clamp the washers 29, 30 and make a water-tight joint. There is preferably no contact of the inner edge of the hole 10ª, in the floor 10, with the stem portion of the rivet 32, through which the thermal sheath 6 extends and by which it is supported, the hole 10ª in the floor 10 being made so large as not to touch said rivet stem, as shown best at Fig. 6.

The upper end of the thermal sheath is connected in a similar manner by a hollow rivet, washers, etc., with the floor 34ª of a bell 35, the latter having a hollow neck 36, extending at its upper end within a head 37; the latter in the form of a screw or bushing which is threaded into a shell 38, fixed centrally in the receptacle 17 and extending down through the floor thereof into the top of the flask 8, and having at its bottom an interior flange 39. A short tube 40, fitting at its lower end into said flange 39, extends up into the shell 38, and an annular packing 41 fits between said tube and the body of the casing. A washer or packing 42 is compressed by the head or screw 37 against the packing 41 and the top of the tube 40, and makes a tight joint with the neck 36 of the bell, so that steam cannot escape from the flask.

The stem 2 of the glass thermometer tube extends up through the neck 36 but out of contact therewith, and at its upper end is partly supported by a packing-ring 43, inserted in head or screw 37. The upper end of the thermometer tube is supported by a soft packing 44 fitting in a vertical tube 45, which is arranged centrally of the box 21 and extends through the same from top to bottom. The glass thermometer tube may be readily lifted up and removed from the apparatus and other thermometer tubes substituted, having different scales thereon; said thermometer tube resting loosely in the supports 44, 43 for ease of removal, as well as to avoid liability of fracture.

The insulation of the upper end of the thermal tube 6, comprising mica washers

29ª and 30ª, serves to prevent heat from being conducted rapidly from this end of the sheath through the bell 35 to the other metal portions of the apparatus. Such loss of heat would tend to lower the heat of the mercury in the thermometer bulb, and to give a false reading or indication of the heat of the apparatus. It is desired that all or substantially all of the heat that is yielded up by said thermal sheath 6 shall be absorbed by the water, and not by the other metal parts of the apparatus, so that any increase of heat of said sheath beyond what is rapidly absorbed by the water will cause the mercury to rise in the thermometer, thus making the apparatus much more sensitive and accurate than would be the case if the heat received by the thermal sheath were to be quickly absorbed by the other metal parts of the apparatus.

Preferably a small thermometer 46 of the usual type, is inserted in the flask, with its mercury bulb 47 immersed in the liquid 11, so that the user can observe whether or not the water is at the boiling point when he reads the scale 12 of the main thermometer 1. The stem 48 of this auxiliary thermometer 46 may fit in a packing 49, compressed by a screw 50 against the bottom 51 of a cup 52 let down into the top of the flask; the stem 48 being also supported by a packing 53 fitted into a hollow of the screw 50.

The sheath 6 and the well 9, as well as the casing 26, may be made long or short as desired, and the well may be made only of sufficient diameter to accommodate what water may be required for effecting the object of the invention. By lengthening the well and the thermal sheath 6, without lengthening the nipple 7, more sheath would be exposed to the action of the water bath, so that the sheath would cool more readily, and hence the mercury would not rise so high in the thermometer tube; and the scale graduations should in that case be placed closer together. The flask 8 may be regarded as an enlargement or drum provided upon the well 9, for the purpose of accommodating the tubes 18, as well as the bell 35, etc. The flask 8 also affords a greater surface area to the water 11, to facilitate steaming.

Preferably nowhere does the thermal sheath 6 or the nipple 7 contact with the metal of the well or of the bell 35, so that it is impossible for any of the heat received by said sheath to be dissipated throughout the metal body parts of the device. The top of the sheath is below the level of the water 11, and the construction is such that only the water in the device affects the heat of the sheath. A gage 54 may be provided for showing the height of the water in the flask 8. It will be seen that neither steam, water, nor cool air from the outside can enter between the tube 2 and the sheath 6, to reduce their temperature, or to impede the heating of the tube by the sheath.

The sheath is always hotter than the water, but does not get so hot as the nipple 7, owing to the fact that the water tends to keep down the temperature of the sheath. At the same time, the water does not rise above a fixed point, because of the conversion thereof into steam; so that the heat of the water remains about uniform during the fluctuations in the heat of the sheath, and the mercury in the tube 4 shows how far the flames and gases, to which the nipple 7 is exposed, succeed in overcoming the tendency of the water to cool the sheath 6. The mercury does not show the difference between the specific degree of heat applied to the nipple 7 and the specific heat of the boiling water, but it marks the difference between the ability of the flames or gases to heat the nipple 7 and the ability of the water to cool the sheath 6; and a very sensitive and reliable pyrometer of great range of action is thus obtained.

It will be noticed that the bell 35, which is itself submerged in a liquid 11 having a fixed temperature, taken with its heat insulating washers 29ª and 30ª, affords means of ending the thermal sheath 6 within the liquid 11; the object being to prevent or minimize the absorption of heat from said sheath 6 by means other than said liquid 11. The parts 36, 37, 38, 40 and 41 conduce to this end. The parts 37, 42, etc., form a stuffing box which is used to prevent escape of steam from the flask 8. The rivets 32 and 32ª may be driven upon the tube 6, or otherwise connected thereto so as to support the same upon the members 10 and 34ª.

At Figs. 7, 8 and 9, the upper portion of the apparatus is shown more fully. The heated water rises through the pipe 14ª, and discharges in a tank 54ª at the top of the apparatus. The cooler portion of the water in the tank 54ª descends through a coil 55 and through the pipes 13ª and 13; the coil 55 (which leads to pipe 13ª) being air cooled and being of sufficient size to keep up the required circulation of the water, which is used for condensing the steam.

Preferably, there is provided a device, in the form of a bag or bottle 56, in communication with the flask 8, for aiding in keeping the pressure substantially uniform in said flask, so that the boiling point of the liquid 11 shall not vary unduly, if at all, thus conducing to the reliability of the instrument. The cross pipe 20, which connects the heads 19 of the condensing clusters 18, opens at 57, Fig. 10, into a short vertical pipe 58, which is closed at its lower end, and is inserted in the chamber 21 and rises therefrom, and is connected at its upper end by a coupling 59 to a hollow stem 60, the latter closed at its top by a cap 61. Said stem 60 supports the relatively large and flabby bottle or bag 56, the normal condition of which is indicated in full lines at Fig. 10. Said bottle has a bottom neck 62 fitting tightly upon the lower end of the stem 60, and an upper neck 63 fitting tightly upon the upper end of said stem; although the bag may be otherwise formed and supported. It is made preferably of soft rubber. The stem 60 has perforations 64 opening into said bag.

When the apparatus is being heated up, any suitable relief valve 65 may be opened to allow the bag, if expanded by the steam, to become deflated to its normal full line size at Fig. 10, and then said valve may be closed.

The object of the bag 56 is to insure, as closely as possible, an unchanging boiling point of the water 11; it being desired on the one hand to guard against increase of pressure in the flask 8 above atmospheric pressure, which would tend to increase the boiling point of the liquid 11, and on the other hand to avoid a reduction of pressure below atmospheric pressure in said flask, that is to avoid the formation of a partial vacuum, which would tend to reduce the boiling point of the water, which it is desirable to maintain at a uniform temperature under all fluctuations of the heat to which the nipple 7 is exposed. Enough of the air, originally contained in the condensing clusters and in the bag, is allowed to escape by means of the relief valve 65, upon heating up the apparatus, to permit the bag to assume its normal size. The bag being relatively large and flimsy will respond instantly to the slightest variation in pressure either inside or out. If an excess of vapor or steam should rise from the liquid, the sides of the bag will swell out as indicated in dotted lines at Fig. 10, but without undue increase of pressure within the bag, since the material thereof will not be stretched by this simple movement of its sides. On the other hand, if vapor or steam should be cooled very suddenly, the bag will collapse inwardly from its full line normal position at Fig. 10, until the pressure within the bag, and hence within the flask 8, is substantially equal to atmospheric pressure. By having the bag of sufficient size and sufficiently flexible, it will therefore be seen that pressure within the flask may be automatically kept substantially uniform. It will be understood, however, that in view of the fact that the steam is condensed rapidly, the bag 56 may be dispensed with in some cases.

As explained, the nipple 7 is heated by the flames and heats the sheath 6, which forms a thermal connection between the nipple and the thermometer. The water 11 takes up heat from said sheath, so that the nipple 7 does not become so hot as the flames or gases to which it is exposed. The sheath 6 may be perhaps one or two hundred degrees hotter than the liquid 11. The heat imparted to the latter causes it to boil. Steam rises in the tubes 18, and is condensed by the cooled water $17^a$; the liquid 11 in the flask being thus maintained at a practically constant temperature just at the boiling point. The heated water $17^a$ rises in the pipes 14, 15, 16, and returns to the tank $54^a$, Fig. 8, or otherwise escapes through pipe $14^a$, whereby much of the heat applied to the nipple 7 is finally dissipated. The mercury rises in the thermometer to a point determined by the heat of the thermal sheath 6; but the mercury does not boil. The reading given by the thermometer scale corresponds to the degree of heat to which the nipple 7 is subjected in the furnace. The heated water $17^a$ at Figs. 7, 8 and 9 rises through the pipe $14^a$, and discharges in tank $54^a$, from which the cooled water descends through coil 55 to pipe $13^a$; the coil 55 being air cooled. The pressure within the flask is kept substantially uniform by the flexible bag or bottle 56; whereby an unchanging boiling point of the water 11 is secured. Other features have been explained in connection with the description of the various parts.

Variations may be resorted to within the scope of the invention, and portions of the improvements may be used without others.

Having thus described my invention, I claim:

1. The combination of a heat-conducting element to be directly exposed to high heat; a heat-measuring element to be heated thereby; a receptacle to contain a stable body of heat-absorbing liquid with which the heat-conducting element is directly in contact, whereby the liquid is constantly heated by said heat-conducting element; and means for constantly maintaining said liquid at substantially its boiling point, to establish a standard or normal temperature for the heat-measuring element which is far below the temperature to which said heat-conducting element is actually exposed, and to protect said heat-conducting element from being injured by such heat.

2. The combination of a heat-conducting element to be directly exposed to high heat; a heat-measuring element to be heated thereby; a receptacle to contain a stable body of heat-absorbing liquid with which the heat-conducting element is directly in contact; and a condenser for cooling and returning the vapor arising from said liquid to constantly maintain the latter at a substantially unvarying temperature, thereby to establish a standard or normal temperature for the heat-measuring element which is far below the temperature to which said heat-conducting element is actually exposed, and to protect said heat-conducting element from being injured by such heat.

3. The combination of a heat-conducting element to be directly exposed to high heat; a heat-measuring element to be heated thereby; a receptacle to contain a stable body of heat-absorbing liquid with which the heat-conducting element is directly in contact; and means for dissipating the heat absorbed by said liquid from said heat-conducting element in a manner to constantly maintain said liquid at a substantially unvarying temperature, thereby to establish a standard or normal temperature for the heat-measuring element which is far below the temperature to which said heat-conducting element is actually exposed, and to protect said heat-conducting element from being injured by such heat.

4. The combination, with a flask; of a heat-conducting sheath arranged within the flask and having a portion projecting therefrom to be directly exposed to high heat; a thermotic device having a part inserted in said sheath to be directly heated thereby; said flask containing a stable body of cooling liquid wherein said sheath is immersed; and a condenser for cooling and returning the vapors arising from said liquid, to constantly maintain the latter at a substantially unvarying temperature, thereby to establish a standard or normal temperature for the thermotic device which is far below the temperature to which the sheath is actually exposed, and to protect the sheath from being injured by such heat.

5. The combination of a heat-conducting sheath having a terminal nipple to be directly exposed to high heat; a thermotic element having a part extending into said sheath and contacting with said nipple to be immediately heated thereby; a receptacle to contain a stable body of heat-absorbing liquid with which the body of said sheath is directly in contact whereby the liquid is constantly heated by said sheath; and means for constantly maintaining said liquid at substantially its boiling point while subjected to the heating action of said sheath, thereby to establish a standard or normal temperature for the thermotic element which is far below the temperature to which said nipple is actually exposed, and to protect said sheath from being injured by such heat.

6. A pyrometer comprising a heat-conducting element to be exposed to high heat; a heat-indicating element immediately in contact therewith to be directly heated thereby, and graduated to indicate the temperature of that portion of said element which is exposed to high heat; a receptacle to contain a stable body of heat-absorbing liquid with which said heat-conducting element is directly in contact whereby the liquid is constantly heated by said heat-conducting element; and means for constantly maintaining said liquid at substantially its boiling point while subjected to the heating action of said heat-conducting element, thereby to establish a standard or normal temperature for the heat-indicating element which is far below the temperature to which said heat-conducting element is actually exposed, and to protect said heat-conducting element from being injured by such heat.

7. The combination of a heat-conducting member to be directly exposed to high heat; a thermotic member in contact therewith to be immediately heated thereby; a receptacle to contain a stable body of heat-absorbing liquid with which said heat-conducting member is in contact whereby the liquid is constantly heated by said heat-conducting members; and means for constantly maintaining said liquid at substantially its boiling point while subjected to the heating action of said heat-conducting member, thereby to establish a standard or normal temperature for the thermotic member which is far below the temperature to which said heat-conducting member is actually exposed, and to protect said heat-conducting member from being injured by such heat, said thermotic member being free of contact with said liquid.

8. The combination with a heat-conducting member to be directly exposed to high heat; of a thermotic member in contact therewith to be immediately heated thereby; a receptacle to contain a stable body of heat-absorbing liquid with which said heat-conducting member is in contact; and a condenser for cooling and returning the vapor arising from said liquid, to maintain the latter at a substantially unvarying temperature, thereby to establish a standard or normal temperature for the thermotic member which is far below the temperature to which said heat-conducting member is actually exposed, and to prevent said heat-conducting member from being injured by such heat; said thermotic member being free of contact with said liquid.

9. A pyrometer comprising a member to be exposed to the heat to be measured, a heat-indicating member in contact therewith, a flask containing liquid in which a portion of the first member is immersed, a condenser connected to said flask and comprising a set of pipes, one of which is a water-supply pipe, and condensing tubes contained in the other pipes and opening into said flask.

10. A pyrometer comprising a member to be exposed to the heat to be measured, a heat-indicating member, an intermediate member thermally connected to both of said members, a flask containing liquid in which said intermediate member is immersed, a condenser connected to said flask and comprising a set of pipes, one of which is a water-supply pipe, condensing tubes contained in the other pipes and opening into said flask, said condensing tubes arranged in clusters and each of said pipes inclosing a cluster, means connecting said condensing tubes at their upper ends, and a chamber containing said connecting means and in communication with the pipes which contain the clusters of tubes.

11. A pyrometer comprising, in combination, a thermometer tube; a heat-conducting sheath in which an end of said tube is inserted, whereby said tube is directly heated by said sheath; a support for said sheath, said sheath extending at one end from said support to be subjected to the heat of the furnace whose temperature is to be ascertained; a receptacle to contain a stable body of heat-absorbing liquid wherein the body of said sheath is immersed whereby the liquid is constantly heated by said sheath; and means for constantly maintaining the temperature of said liquid, during fluctuations in the heat of the furnace, at about a uniform point while subjected to the heating action of said sheath, to establish a standard or normal temperature for said tube which is substantially below the heat of the furnace, and to protect said sheath from being injured by such heat.

12. A pyrometer comprising, in combination, a heat-conducting metal sheath terminating in a nipple to be directly exposed to high heat; a thermometer tube inserted in said sheath to be immediately heated thereby; means for supporting said tube and sheath; a receptacle to contain a stable body of heat-absorbing liquid with which said sheath is directly in contact whereby the liquid is constantly heated by said sheath; and means to maintain said liquid at substantially its boiling point while subjected to the heating action of said sheath, thereby to establish a standard or normal temperature for said thermometer tube which is far below the temperature to which said nipple is actually exposed, during fluctuations in said heat, and to protect said sheath from injury by such heat, said tube being provided with a scale by which the real heat of the thermometric liquid in the tube is greatly exaggerated, to indicate the degree of heat to which said nipple is actually exposed.

13. The combination of a flask having a portion in the form of a well; a tube of heat-conducting metal in said flask and extending through the bottom of said well and terminating in a nipple to be directly exposed to high heat; means for supporting said tube, including insulating devices to prevent the heat of the tube from being disseminated through the walls of the flask; a thermotic device having a portion inserted in said tube to be directly heated thereby, said flask and well containing a stable body of heat-absorbing liquid with which said tube is in direct contact whereby the liquid is constantly heated by said tube; and means for constantly maintaining said liquid at substantially its boiling point while subjected to the heating action of said tube, thereby to establish a standard or normal temperature for said thermotic device which is far below the temperature to which said nipple is actually exposed, and to protect said tube from being injured by such heat.

14. The combination of a flask having a portion in the form of a well, a tube of heat-conducting metal in said flask and extending through the bottom of said well and terminating at its lower end in a nipple, means for supporting said tube, including insulating devices to prevent the heat of the tube from being disseminated through the walls of the flask, a thermotic device having a portion inserted in said tube, said supporting means including a hollow rivet in which said tube fits, the stem of said rivet extending up through the floor of said well, a washer surrounding said rivet, the latter being turned over upon said washer, and heat-insulating washers surrounding the body portion of said rivet on both sides of the floor of the well.

15. The combination of a flask having a portion in the form of a well, a tube of heat-conducting metal in said flask and extending through the bottom of said well and terminating at its lower end in a nipple, means for supporting said tube, including insulating devices to prevent the heat of the tube from being disseminated through the walls of the flask, a thermotic device having a portion inserted in said tube, said supporting means including a hollow rivet in which said tube fits, the stem of said rivet extending up through the floor of said well, a washer surrounding said rivet, the latter being turned over upon said washer, and heat-insulating washers surrounding the body portion of said rivet on both sides of the floor of the well; said floor having an opening through which said tube extends, and the edge of said opening being out of contact with said tube.

16. The combination of a glass thermometer tube containing a heat-measuring liquid, a sheath of copper in which the lower end of said tube is inserted, and a flask or receptacle containing liquid in which said sheath is immersed, said sheath and said thermometer tube projecting through the bottom of said receptacle.

17. The combination of a glass thermometer tube containing a heat-measuring liquid, a sheath of copper in which the lower end of said tube is inserted, a flask or receptacle containing liquid in which said sheath is immersed, said sheath and said thermometer tube projecting through the bottom of said receptacle, and a protecting shell around said receptacle, means being provided for insulating said sheath from the walls of said receptacle to reduce or eliminate the dissipation of heat from the thermal sheath through said walls.

18. The combination with a flask to contain a liquid, of a heat-conducting sheath supported in the flask to be immersed in the liquid and having a portion projecting from the flask to be exposed to high heat, a thermotic device having a part inserted in said sheath, a condenser to cool and return the vapor arising from the liquid, and a flexible bottle or bag connected to said condenser, said bottle being both collapsible and expansible from normal condition, to cause the pressure upon the liquid in said flask to be about equal to atmospheric pressure.

19. The combination with a flask to contain a liquid, of a heat-conducting sheath supported in the flask to be immersed in the liquid and having a portion projecting from the flask to be exposed to high heat, a thermotic device having a part inserted in said sheath, a condenser to cool and return the vapor arising from the liquid, and a flexible bottle or bag connected to said condenser, said bottle being both collapsible and expansible from normal condition, to cause the pressure upon the liquid in said flask to be about equal to atmospheric pressure, and a relief valve to permit reduction of pressure in the flask when the apparatus is being heated up.

20. A pyrometer comprising, in combination, a flask; a heat-conducting member to be directly exposed to the heat to be measured; a thermometer having a portion inserted in said heat-conducting member to be immediately heated thereby, said flask containing a stable body of heat-absorbing liquid wherein a portion of said heat-conducting member is immersed whereby the liquid is constantly heated by said heat-conducting member; and a condenser coil opening into said flask for cooling and returning the vapor arising from said liquid, to keep the temperature of the latter substantially unvarying, thereby to establish a standard or normal temperature for the thermometer which is far below the temperature to which said member is actually exposed, and to protect the said member from injury by such heat.

21. A pyrometer comprising, in combination, a flask; a heat-conducting member to be directly exposed to the heat to be measured; a thermometer having a portion inserted in said heat-conducting member to be immediately heated thereby, said flask containing a stable body of heat-absorbing liquid wherein a portion of said heat-conducting member is immersed whereby the liquid is constantly heated by said heat-conducting member; a condenser coil opening into said flask for cooling and returning the vapor arising from said liquid, to keep the temperature of the latter substantially unvarying, thereby to establish a standard or normal temperature for the thermometer which is far below the temperature to which said member is actually exposed, and to protect the said member from injury by such heat; and a water-vessel or receptacle inclosing said coil.

GEORGE F. MACHLET.

Witnesses:
SAMUEL R. OGDEN,
PHILIP C. OSTERMAN.

Copies of this patent may be obtained for five cents each, by addressing the "Commissioner of Patents, Washington, D. C."